(12) United States Patent
Ezra

(10) Patent No.: US 11,574,322 B2
(45) Date of Patent: Feb. 7, 2023

(54) IDENTIFYING A LOCATION BASED ON EXPECTED DIFFERENCES BETWEEN ONLINE SYSTEM USERS EXPECTED TO BE AT THE LOCATION AND ONLINE SYSTEM USERS PREVIOUSLY AT THE LOCATION

(71) Applicant: Meta Platforms, Inc., Menlo Park, CA (US)

(72) Inventor: Yizhaq Ezra, Berkeley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 712 days.

(21) Appl. No.: 15/788,786

(22) Filed: Oct. 19, 2017

(65) Prior Publication Data
US 2019/0122230 A1 Apr. 25, 2019

(51) Int. Cl.
*G06Q 30/02* (2012.01)
*G06Q 50/00* (2012.01)

(52) U.S. Cl.
CPC ......... *G06Q 30/0201* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,364,171 B2 * | 1/2013 | Busch | ................ | G06Q 20/384 455/456.1 |
| 8,768,867 B1 * | 7/2014 | Thaeler | ................ | G06Q 30/02 706/12 |
| 8,990,108 B1 * | 3/2015 | Mann | ................ | G06Q 30/0261 705/14.71 |
| 9,009,093 B1 * | 4/2015 | Omoigui | ............ | G06Q 30/0261 706/45 |
| 9,088,625 B1 * | 7/2015 | Moczydlowski | ....... | H04L 67/22 |
| 9,489,692 B1 * | 11/2016 | Yu | ....................... | G06Q 30/0275 |
| 9,516,470 B1 * | 12/2016 | Scofield | ................ | H04W 4/029 |

(Continued)

OTHER PUBLICATIONS

Kai Li, Timon C. Du, Building a targeted mobile advertising system for location-based services, Decision Support Systems, vol. 54, Issue 1, 2012, pp. 1-8 (Year: 2012).*

(Continued)

*Primary Examiner* — Darlene Garcia-Guerra
(74) *Attorney, Agent, or Firm* — Fenwick & West LLP

(57) ABSTRACT

An online system predicts whether a location will experience a threshold increase in traffic over the location's historical average amount of traffic. To predict a future deviation over historical traffic, the online system identifies events within a threshold distance of the location and determines an average number of indications that users will attend events within a threshold radius of the location during a prior time interval. The online system determines a total number of indications that users will attend future events within the threshold distance of the location, disregarding locations associated with less than a threshold number of future events and future events for which the online system received less than a threshold number of indications that users will attend, and determines a ratio of the total number of indications to the average number of indications that users will attend received for the prior events during the time interval.

7 Claims, 3 Drawing Sheets

(56) References Cited

U.S. PATENT DOCUMENTS

| | | | | |
|---|---|---|---|---|
| 9,846,887 | B1* | 12/2017 | Cranshaw | G06Q 30/0205 |
| 10,262,335 | B2* | 4/2019 | Zises | G06Q 30/0252 |
| 10,567,253 | B1* | 2/2020 | O'Toole | H04L 67/10 |
| 10,580,023 | B2* | 3/2020 | Bostick | G06Q 30/0205 |
| 10,664,857 | B2 | 5/2020 | Faith et al. | |
| 10,687,167 | B1* | 6/2020 | Joseph | H04W 4/029 |
| 2004/0156326 | A1* | 8/2004 | Chithambaram | H04W 4/029 |
| | | | | 370/310 |
| 2006/0271415 | A1* | 11/2006 | Simmons | G06Q 30/02 |
| | | | | 705/14.66 |
| 2009/0115617 | A1* | 5/2009 | Sano | H04L 67/306 |
| | | | | 340/573.1 |
| 2009/0125380 | A1* | 5/2009 | Otto | G06Q 30/0201 |
| | | | | 705/7.29 |
| 2011/0238517 | A1* | 9/2011 | Ramalingam | G06Q 20/40 |
| | | | | 705/26.1 |
| 2012/0063427 | A1* | 3/2012 | Kandekar | G06Q 30/0251 |
| | | | | 370/338 |
| 2012/0150586 | A1* | 6/2012 | Harper | G06Q 30/0204 |
| | | | | 705/7.33 |
| 2012/0290383 | A1* | 11/2012 | Busch | G06Q 30/02 |
| | | | | 705/14.58 |
| 2013/0132194 | A1* | 5/2013 | Rajaram | G06Q 50/01 |
| | | | | 705/14.52 |
| 2013/0137464 | A1* | 5/2013 | Kramer | G06Q 30/02 |
| | | | | 455/456.3 |
| 2013/0166385 | A1* | 6/2013 | Russell | G06F 16/9537 |
| | | | | 705/14.58 |
| 2014/0129337 | A1* | 5/2014 | Otremba | G06Q 30/0261 |
| | | | | 705/14.58 |
| 2014/0278031 | A1* | 9/2014 | Scofield | G08G 1/096888 |
| | | | | 701/118 |
| 2015/0178691 | A1* | 6/2015 | Lineberger | G06F 40/134 |
| | | | | 705/7.19 |
| 2015/0227975 | A1* | 8/2015 | Momin | G06Q 30/0207 |
| | | | | 705/14.1 |
| 2016/0162938 | A1* | 6/2016 | LeBeau | G06Q 30/0255 |
| | | | | 705/14.53 |
| 2016/0196577 | A1* | 7/2016 | Reese | H04W 4/023 |
| | | | | 705/14.5 |
| 2016/0219398 | A1* | 7/2016 | Kamensky | G06Q 30/02 |
| 2017/0032416 | A1* | 2/2017 | Soni | G06Q 30/0254 |
| 2017/0098184 | A1* | 4/2017 | Marco | G08G 1/202 |
| 2017/0116528 | A1* | 4/2017 | Barajas Gonzalez | |
| | | | | G08G 1/0129 |
| 2017/0193553 | A1* | 7/2017 | Busch | G06Q 20/322 |
| 2017/0200105 | A1* | 7/2017 | Bassinder | G06Q 10/087 |
| 2017/0372358 | A1* | 12/2017 | Duque de Souza | |
| | | | | G06Q 30/0249 |
| 2018/0025373 | A1* | 1/2018 | Perriman | G06Q 50/01 |
| | | | | 705/7.11 |
| 2018/0124566 | A1* | 5/2018 | Colonna | H04W 4/029 |

OTHER PUBLICATIONS

Wang, Hsiu-Yuan. "Predicting customers' intentions to check in on Facebook while patronizing hospitality firms." Service Business 10.1 (2016): 201-222 (Year: 2016).*

Andrews, Michelle, et al. "Mobile ad effectiveness: Hyper-contextual targeting with crowdedness." Marketing Science 35.2 (2016): 218-233 (Year: 2016).*

* cited by examiner

IDENTIFYING A LOCATION BASED ON EXPECTED DIFFERENCES BETWEEN ONLINE SYSTEM USERS EXPECTED TO BE AT THE LOCATION AND ONLINE SYSTEM USERS PREVIOUSLY AT THE LOCATION

BACKGROUND

This disclosure relates generally to presenting content to users of an online system, and more specifically to identifying locations likely to include an increased number of online system users to a publishing user providing content to the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Many online systems allow users to create events, invite users to an event, and maintain information identifying users who will attend the event. For example, a user identifies a location, a time, and a description of an event to the online system, which stores the time, the location, and the description in association with an event identifier. The user also identifies other users to invite to attend the event to the online system, which stores information identifying the other users in association with the event identifier and sends invitations to attend to event to the other users. As the other users respond to the invitations, the online system receives the responses and stores information identifying users who indicated they will attend the event and users who have indicated they will not attend the event.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

Publishing users may provide content to the online system for presentation to users based on locations of the users. For example, a publishing user having a business at a particular location provides content to the online system for presentation to users who are within a threshold distance of the particular location to entice users to visit the business. However, numbers of online system users within the threshold distance of the particular location may change depending on events within the threshold distance of the particular location. Publishing users are often unaware of events occurring within the threshold distance of the particular location and determine amounts of content provided to the online system for presentation or compensation to the online system for presenting content based on historical numbers of users within the threshold distance of the particular location. This causes many publishing users to miss opportunities to present content when numbers of users within a threshold distance of a location are likely to exceed historical numbers of users within the threshold distance of the location, decreasing users exposed to content from the publishing users while also decreasing compensation to the online system from the publishing users.

SUMMARY

The online system maintains information identifying events identifying locations and times for various users of the online system to gather. Each event is associated with a location, such as a geographic location of a business or geographic location of any other suitable physical location, and a time. One or more events are created or defined by a creating user who provides a description of an event, a geographic location associated with the event, and a time associated with the event to the online system. The creating user also identifies one or more users of the online system who are invited to the event. The online system maintains information identifying an event, the location associated with the event, the time associated with the event, and users who are invited to the event. For example, the online system generates an event identifier uniquely identifying the event and maintains a name of the event, and a description of the event, a location of the event, a time of the event, and users who are invited to the event in association with the event identifier.

The online system transmits invitations to one or more events to client devices associated with users who are invited to the one or more events and receives responses to the invitations to various users from the various users. The online system receives indications from various users that the users will attend events to which the various users were invited and stores the indications in association with the users and in association with the events. Alternatively, the online system receives responses to the inventions from one or more users indicating the one or more users will not attend an event and stores the responses in association with the one or more users and in association with the event. A response to an invitation received from a user includes information identifying the user providing the response as well as identifying an event associated with the invitation.

The online system may also receive location information from various client devices associated with users of the online system and stores the retrieved location information in association with the users. For example, a client device transmits information identifying a geographic location (e.g., a latitude and a longitude, a semantic name of a location) and a time associated with the geographic location along with information identifying a user of the online system associated with the client device to the online system. The online system stores the received geographic location of the client device and the time in association with the user (e.g., in a user profile of the user). In various embodiments, users specify one or more privacy settings to regulate communication of information identifying a geographic location of a client device from the client device to the online system; the privacy settings may be maintained in a user profile maintained by the online system for the user in various embodiments.

The online system identifies a specific location to evaluate a number of users within a threshold distance of the specific locations. For example, the online system identifies a specific location that is a geographic location of a business. In various embodiments, the online system receives a request identifying the specific location from a publishing user associated with the specific location. For example, a publishing user associated with a business provides a request identifying a geographic location of the business or associated with the business to the online system. In some embodiments, a request received from a publishing user includes a specific time for the online system to evaluate a number of users within the threshold distance of the specific location (e.g., the location of a business).

Based on the information identifying various events, the online system retrieves events that are associated with times within a time interval prior to a time when the specific location was identified and that are also associated with locations within a threshold distance of the specific location. In various embodiments, the threshold distance is a parameter maintained by the online system. The online system may maintain different threshold distances for specific locations having different characteristics. In some embodiments, the online system maintains different threshold distances for different types of businesses that are identified by the specific location. For example, different threshold distances are associated with specific locations corresponding to businesses that provide different types of products or that otherwise have different characteristics. In other embodiments, the publishing user associated with the specific location provides the threshold distance to the online system (e.g., includes the threshold distance in a request identifying the specific location, provides the threshold distance to the online system as information associated with the online system). The online system may also determines a duration of the time interval prior to the time when the specific location was identified. The duration of the time interval may modified by the online system based on various factors (e.g., time of year, characteristics of the specific location, etc.).

From received indications that users will attend the events that are associated with times within a time interval prior to a time when the specific location was identified and that are also associated with locations within a threshold distance of the specific location, the online system determines an average number of indications that users will attend the events associated with times within the time interval prior to a time when the specific location was identified and associated with locations within the threshold distance of the specific location. For example, the online system sums received indications that users will attend the events associated with times within the time interval prior to a time when the specific location was identified and associated with locations within the threshold distance of the specific location and divides the sum by the time interval prior to the time when the specific location was identified. In some embodiments, the online system identifies events associated with times within the time interval prior to the time when the specific location was identified and associated with locations within the threshold distance of the specific location for which the online system received at least a threshold number of indications that users will attend the events. The online system determines the average number of indications based on the number of received indications that users will attend the identified events; for example, the online system sums received indications that users will attend the identified events and divides the sum by the time interval prior to the time when the specific location was identified. In other embodiments, the online system identifies locations within the threshold distance of the specific location that are associated with at least a threshold number of events based on the maintained information identifying events. The online system identifies events associated with identified locations that are also associated with times within the time interval prior to the time when the specific location was identified, associated with locations within the threshold distance of the specific location, and for which the online system received at least the threshold number of indications that users will attend the events. The online system determines the average number of indications based on the number of received indications that users will attend the identified events; for example, the online system sums received indications that users will attend the identified events and divides the sum by the time interval prior to the time when the specific location was identified.

If the online system received geographic locations and times from client devices and maintained the geographic locations and times in association with users associated with the client devices, the online system determines an average number of users within the time interval prior to the time when the specific location was identified and associated with locations within the threshold distance of the specific location. For example, the online system determines an average number of users for whom the online system maintained geographic locations within the threshold distance of the specific location based on geographic locations and times received from client devices and associated with users. As another example, the online system applies a trained model to a total number of indications that users will attend events associated with times within the time interval after the time when the specific location was identified and associated with locations within the threshold distance of the specific location and to geographic locations and times received form client devices associated with users. Application of the trained model in the preceding example allows the online system to account for received indications that users will attend events as well as geographic information received from client devices when determining an average number of users within a threshold distance of the specific location.

Additionally, the online system determines a total number of indications that users will attend events associated with times within a time interval after the time when the specific location was identified and associated with locations within the threshold distance of the specific location based on the received indications. The online system determines a ratio of the total number of indications that users will attend events associated with times within the time interval after the time when the specific location was identified and associated with locations within the threshold distance of the specific location based on the received indications to the average number of indications that users will attend the events associated with times within the time interval prior to the time when the specific location was identified and associated with locations within a threshold distance of the specific location based on the received indications. In response to the ratio equaling or exceeding a threshold, the online system transmits a notification identifying the specific location and the time interval after the time when the specific location was identified to a client device of a publishing user associated with the specific location. For example, the online system transmits a notification identifying the specific location and the time interval after the time when the specific location was identified for which the online system determined the ratio equaled or exceeded the threshold to the publishing user who identified the specific location to the online system.

In other embodiments, the online system determines any suitable metric describing a difference between the total number of indications that users will attend events associated with times within the time interval after the time when the specific location was identified and associated with locations within the threshold distance of the specific location based on the received indications and the average number of indications that users will attend the events associated with times within the time interval prior to the time when the specific location was identified and associated with locations within a threshold distance of the specific location based on the received indications. For example, the online system determines a percentage increase between the total number of indications that users will attend events associated with times within the time interval after the time when the specific location was identified and associated with locations within the threshold distance of the specific location based on the received indications and the average number of indications that users will attend the events associated with times within the time interval prior to the time when the specific location was identified and associated with locations within a threshold distance of the specific location based on the received indications. If the percentage increase equals or exceeds a threshold, the online system transmits the notification to the publishing user.

The notification may include a recommendation to the publishing user to provide a content item associated with the specific location to the online system for presentation to users; in some embodiments, the online system retrieves characteristics of users from whom indications the users will attend one or more events associated with times within the time interval after the time when the specific location was identified and associated with locations within the threshold distance of the specific location, generates targeting criteria for the content item from the retrieved characteristics, and includes the generated targeting criteria in the notification. This allows the publishing user to leverage characteristics of users who have indicated to the online system that they will be within the threshold distance of the specific location during the time interval to increase likelihoods of the content item being presented to the users who have indicated to the online system that they will be within the threshold distance of the specific location during the time interval to increase likelihoods of the content item. Alternatively or additionally, the online system identifies one or more of the events associated with times within the time interval after the time when the specific location was identified in the notification. For example, the online system includes a name and a location of one or more of the events associated with times within the time interval after the time when the specific location was identified 315 in the notification.

Hence, the online system identifies a specific location based on a deviation of the number of users likely to be within the threshold distance of the specific location during a time interval relative to a historical average number of users within the threshold distance of the specific location. As the online system receives information from users indicating that users plan to attend events at various locations, the online system leverages this information about likely future locations of users along with information identifying locations of users to indicate locations or times when a number of users within the threshold distance of the specific location are likely to increase relative to historical numbers of users within the threshold distance of the specific location. Identifying such a deviation in the number of users within the specific location allows a publishing user to potentially increase a number of users to whom content is presented via the online system, which may also increase an amount of revenue the online system receives from the publishing user for presenting content to users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
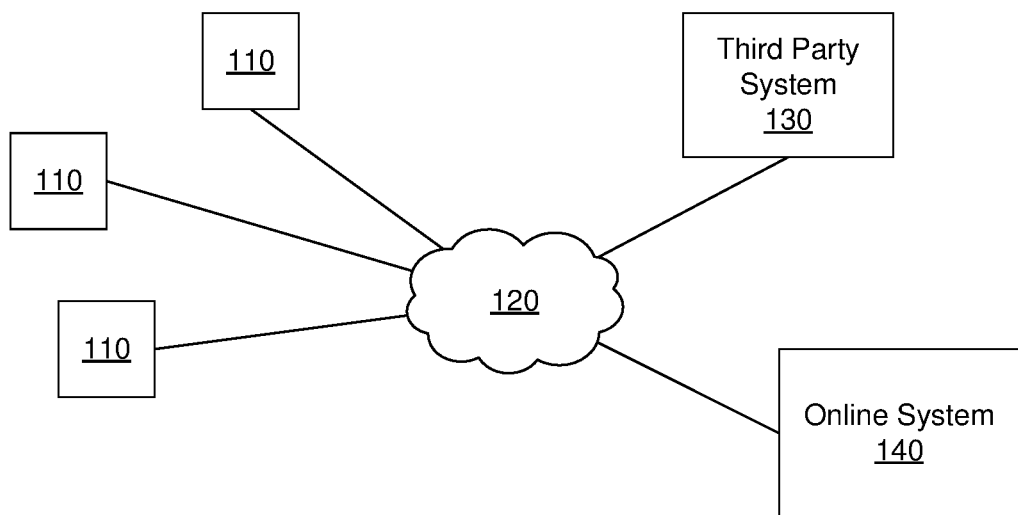
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

In various embodiments, one or more client devices 110 include a positioning system that determines a geographic location of a client device 110. For example, a client device 110 includes a global positioning system (GPS) that receives geolocation and time information for the client device 110 from satellites. The positioning system may use additional or alternative information, such as signal strength to various network devices (e.g., wireless access points, cellular towers) and locations of the network devices, to determine a location of the client device 110. An application associated with the online system 140 and executing on the client device 110 may communicate location information of the client device 110 from the positioning system to the online system 140 along with an identifier of an online system user associated with the client device 110. The online system 140 may store the location information in association with the online system corresponding to the identifier. In various embodiments, the online system user associated with the client device 110 regulates transmission of location information from the client device 110 to the online system 140 through one or more privacy settings maintained by the application associated with the online system 140 or maintained by the online system 140. The privacy settings allow a user to regulate or to stop transmission of location information from the client device 110 to the online system 140.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 140 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item.

Figure 2:
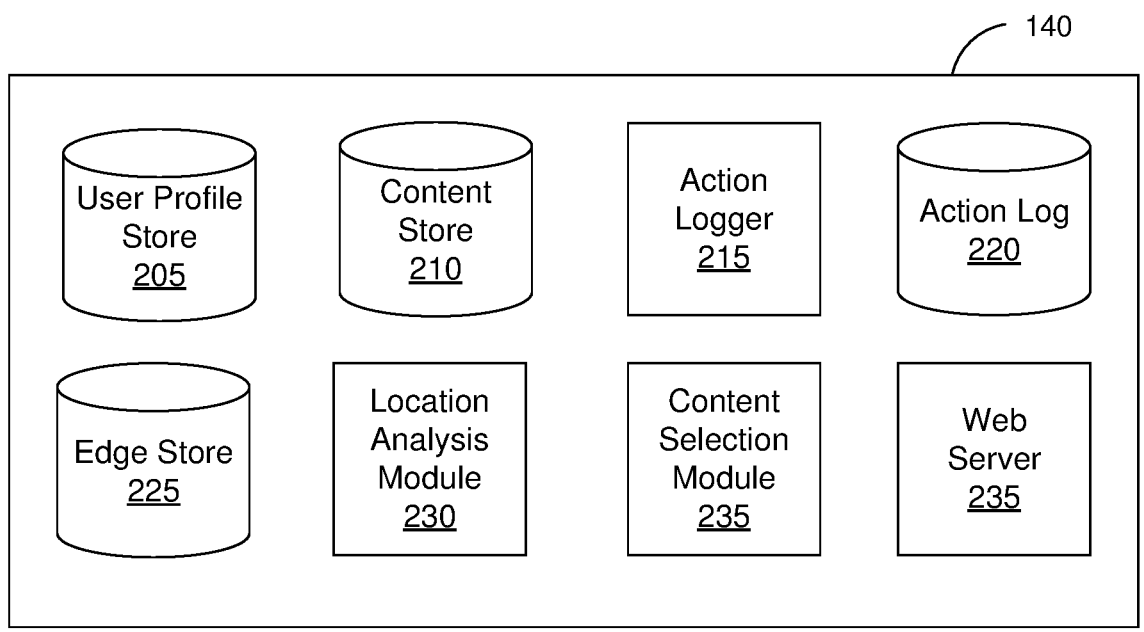
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a location analysis module 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, the content sore 210 includes information describing events that each identify a time, a location, and users invited to arrive at the identified location at the identified time. For example, an event identifies a geographic location associated with a business, and a time for users to arrive at the geographic location associated with the business. One or more events are created or defined by a creating user who provides a description of an event, a location associated with the event, and a time associated with the event to the online system 140, which stores the creating user, the location, and the time in the content store 210 in association with an event identifier uniquely identifying the event. The creating user may also specify a name and a description of the event that is also included in the content store 210 in association with the event identifier for the event. The creating user also identifies one or more users of the online system 140 who are invited to the event, and information identifying the users invited to the event is included in the content store 210 in association with the event identifier. As users who are invited to the event provide responses to the online system 140 indicating whether the users will attend the event, the online system 140 associates a response received form a user along with the information identifying the user associated with the event identifier. This allows the content store 210 to maintain information describing users who have indicated they will attend an event, as well as information describing users who have indicated they will not attend an event.

One or more content items included in the content store 210 include a creative, which is content for presentation to a user, and a bid amount. As used herein, a content item including a bid amount is referred to as a "sponsored content item," while a content item that does not include a bid amount is referred to as an "organic content item." The creative is text, image, audio, video, or any other suitable data presented to a user. In various embodiments, the creative also specifies a page of content. For example, a content item includes a landing page specifying a network address of a page of content to which a user is directed when the content item is accessed. The bid amount included in a sponsored content item specifies an amount of compensation the online system 140 receives from a publishing user associated with the sponsored content item and is used to determine an expected value, such as monetary compensation, provided by the publishing user to the online system 140 if content in the sponsored content item is presented to a user, if the content in the sponsored content item receives a user interaction when presented, or if any suitable condition is satisfied when content in the sponsored content item is presented to a user. For example, the bid amount included in a sponsored content item specifies a monetary amount that the online system 140 receives from a publishing user who provided the sponsored content item to the online system 140 if content in the sponsored content item is displayed. In some embodiments, the expected value to the online system 140 of presenting the content from the sponsored content item may be determined by multiplying the bid amount by a probability of the content of the sponsored content item being accessed by a user.

Various sponsored content items may include an objective identifying an interaction that a user associated with a sponsored content item desires other users to perform when presented with content included in the sponsored content item. Example objectives include: installing an application associated with a sponsored content item, indicating a preference for a sponsored content item, sharing a sponsored content item with other users, interacting with an object associated with a sponsored content item, or performing any other suitable interaction. As content from a sponsored content item is presented to online system users, the online system 140 logs interactions between users presented with the sponsored content item or with objects associated with the sponsored content item. Additionally, the online system 140 receives compensation from a publishing user associated with a sponsored content item as online system users perform interactions with the sponsored content item that satisfy the objective included in the sponsored content item.

Additionally, a sponsored content item may include one or more targeting criteria specified by the publishing user who provided the sponsored content item to the online system 140. Targeting criteria included in a sponsored content item request specify one or more characteristics of users eligible to be presented with the sponsored content item. For example, targeting criteria are used to identify users having user profile information, edges, or actions satisfying at least one of the targeting criteria. Hence, targeting criteria allow a publishing user to identify users having specific characteristics as eligible to be presented with content from a sponsored content item, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows publishing users to further refine users eligible to be presented with sponsored content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), expressing a reaction to an object, and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Various third party systems 130 may include tracking mechanisms in content comprising instructions that, when executed by a client device 110, provide information identifying the content and identifying a user of the online system 140 associated with the client device 110 to the online system 140. In various embodiments, the information provided by the tracking mechanism identifies one or more products associated with a third party system 130 and include in, or otherwise associated with, the identified content. The information identifying the content is stored in the action log 220 in association with information identifying the user to the online system 140. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The location analysis module 230 identifies a specific location and determines whether a number of users within a threshold distance of the specific location deviates from an average number of users within the threshold distance of the specific location during a time interval. As further described below in conjunction with FIG. 3, the location analysis module 230 retrieves information from the content store 210 describing various events. Based on a number of users who indicated they will attend events within the threshold distance of the specific location prior to identifying the specific location, the location analysis module 230 determines an average number of users within the threshold distance of the specific location; in some embodiments, the online system 140 obtains location information received from various client devices 110 included in user profiles when determining the average number of users within the threshold distance of the specific location. Similarly, the location analysis module 230 determines a number of users who have indicated they will attend events within the threshold distance of the specific location and during the time interval. As further described below in conjunction with FIG. 3, the location analysis module 230 generates a metric based on the average number of users within the threshold distance of the specific location and the number of users who have indicated they will attend events within the threshold distance of the specific location and during the time interval. If the metric indicates the number of users who have indicated they will attend events within the threshold distance of the specific location and during the time interval is at least a threshold amount greater than the average number of users within the threshold distance of the specific location, the location analysis module 230 transmits a notification identifying the time interval and the specific location to a publishing user to encourage the publishing user to provide the online system 140 with one or more content items for presentation to users within the threshold distance of the specific location during the time interval.

The content selection module 235 selects one or more content items for communication to a client device 110 to be presented to a user. Content items eligible for presentation to the user are retrieved from the content store 210 or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may include content items associated with bid amounts (i.e., "sponsored content items"). The content selection module 235 uses the bid amounts associated with ad requests when selecting content for presentation to the user. In various embodiments, the content selection module 235 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 235 may rank content items based on their associated bid amounts and select content items having at least a threshold position in the ranking for presentation to the user. In some embodiments, the content selection module 235 ranks both content items not associated with bid amounts and content items associated with bid amounts in a unified ranking based on bid amounts and measures of relevance associated with content items. For example, the content selection module 235 generates a score for sponsored content items by combining bid amounts included in sponsored content items (or expected values of sponsored content items) with expected amounts of interaction with content included in the sponsored content items. The content selection module 235 selects sponsored content items and organic content items for presentation to the user based on their scores and measures of relevance (or expected amounts of interaction), respectively. Based on the unified ranking, the content selection module 235 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more content items including bid amounts (i.e., "sponsored content items") and other content items that do not include bid amounts (i.e., "organic content items"), such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 235 to identify candidate content items eligible for presentation to the user. For example, content items associated with users who not connected to the user or stories associated with users for whom the user has less than a threshold affinity are discarded as candidate content items. Based on various criteria, the content selection module 235 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 235 presents content to a user through a feed of content including a plurality of content items selected for presentation to the user. One or more content items may also be included in the feed of content. The content selection module 235 may also determine the order in which selected content items are presented via the feed of content. For example, the content selection module 235 orders content items content in the feed based on likelihoods of the user interacting with various content items.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Figure 3:
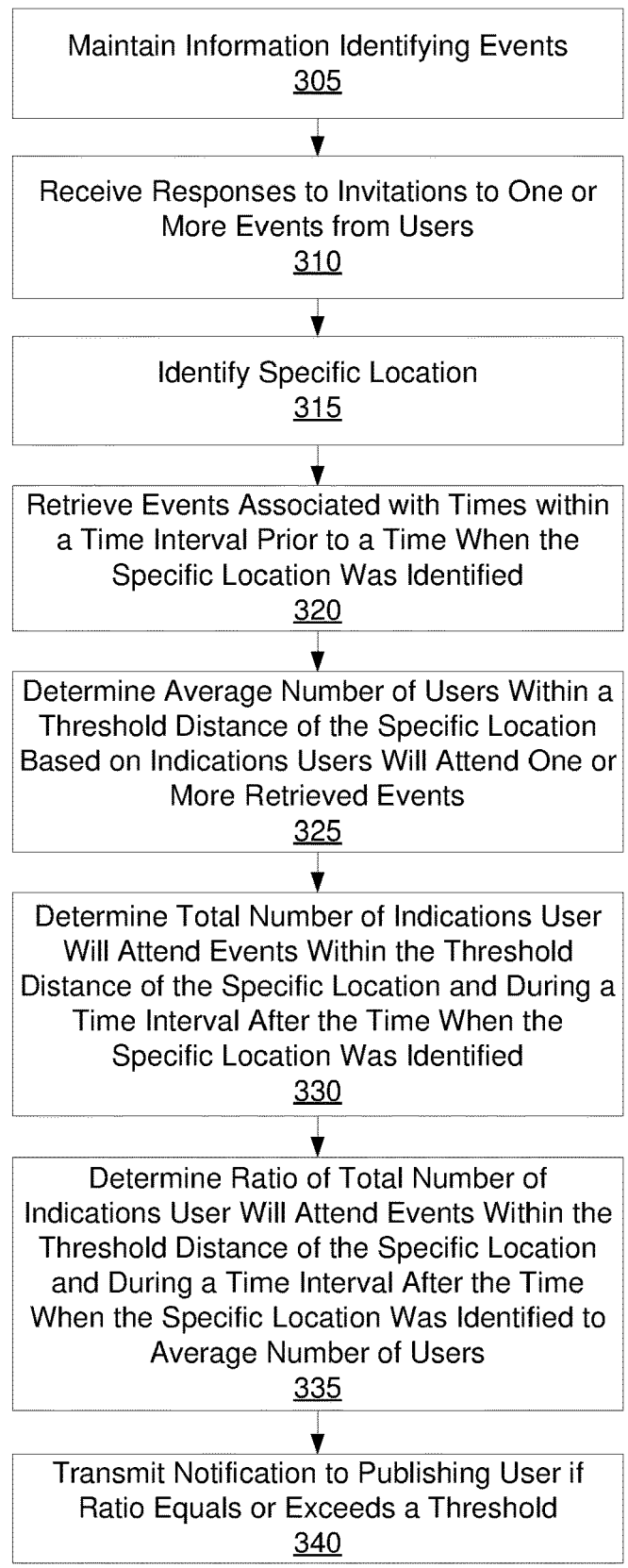
FIG. 3 is a flowchart of a method for an online system predicting changes to a number of users within a threshold distance of a location, in accordance with an embodiment.

Predicting Changes in a Number of Users within a Threshold Distance of a Location FIG. 3 is a flowchart of a method for an online system 140 predicting changes to a number of users within a threshold distance of a location. In other embodiments, the method may include different and/or additional steps than those shown in FIG. 3. Additionally, steps of the method may be performed in different orders than the order described in conjunction with FIG. 3 in various embodiments.

As further described above in conjunction with FIG. 2, the online system 140 maintains 305 information identifying events. Each event is associated with a location, such as a geographic location of a business or geographic location of any other suitable physical location, and a time. One or more events are created or defined by a creating user who provides a description of an event, a geographic location associated with the event, and a time associated with the event to the online system 140. The creating user also identifies one or more users of the online system 140 who are invited to the event. The online system 140 maintains 305 information identifying an event, the location associated with the event, the time associated with the event, and users who are invited to the event. For example, the online system 140 generates an event identifier uniquely identifying the event and maintains 305 a name of the event, and a description of the event, a location of the event, a time of the event, and users who are invited to the event in association with the event identifier.

The online system 140 transmits invitations to one or more events to client devices 110 associated with users who are invited to the one or more events. An invitation transmitted to a client device associated with a user invited to an event includes information identifying the event, a location associated with the event, and a time associated with the event. Additionally, the invitation transmitted to a client device 110 may include one or more options for responding to the invitation. For example, an option included in an invitation is an indication the user will attend the event, while another option included in the invitation is an indication the user will not attend the event.

Subsequently, the online system 140 receives 310 responses to the invitations to various users from the various users. The online system 140 receives 310 indications from various users that the users will attend events to which the various users were invited and stores the indications in association with the users and in association with the events. Alternatively, the online system 140 receives 310 responses to the invitations from one or more users indicating the one or more users will not attend an event and stores the responses in association with the one or more users and in association with the event. A response to an invitation received 310 from a user includes information identifying the user providing the response as well as identifying an event associated with the invitation.

The online system 140 may also receive location information from various client devices 110 associated with users of the online system 140 and stores the retrieved location information in association with the users. For example, a client device 110 transmits information identifying a geographic location (e.g., a latitude and a longitude, a semantic name of a location) and a time associated with the geographic location along with information identifying a user of the online system 140 associated with the client device 110 to the online system 140. The online system 140 stores the received geographic location of the client device 110 and the time in association with the user (e.g., in a user profile of the user). In various embodiments, users specify one or more privacy settings to regulate communication of information identifying a geographic location of a client device 110 from the client device 110 to the online system 140; the privacy settings may be maintained in a user profile maintained by the online system 140 for the user in various embodiments.

The online system 140 identifies 315 a specific location to evaluate a number of users within a threshold distance of the specific locations. For example, the online system 140 identifies 315 a specific location that is a geographic location of a business. In various embodiments, the online system 140 receives a request identifying the specific location from a publishing user associated with the specific location. For example, a publishing user associated with a business provides a request identifying a geographic location of the business or associated with the business to the online system 140. In some embodiments, a request received from a publishing user includes a specific time for the online system 140 to evaluate a number of users within the threshold distance of the specific location (e.g., the location of a business).

Based on the information identifying various events, the online system 140 retrieves 320 events that are associated with times within a time interval prior to a time when the specific location was identified 315 and that are also associated with locations within a threshold distance of the specific location. In various embodiments, the threshold distance is a parameter maintained by the online system 140. The online system 140 may maintain different threshold distances for specific locations having different characteristics. In some embodiments, the online system 140 maintains different threshold distances for different types of businesses that are identified by the specific location. For example, different threshold distances are associated with specific locations corresponding to businesses that provide different types of products or that otherwise have different characteristics. In other embodiments, the publishing user associated with the specific location provides the threshold distance to the online system 140 (e.g., includes the threshold distance in a request identifying the specific location, provides the threshold distance to the online system 140 as information associated with the online system 140). The online system 140 may also determines a duration of the time interval prior to the time when the specific location was identified 315. The duration of the time interval may modified by the online system 140 based on various factors (e.g., time of year, characteristics of the specific location, etc.).

From received indications that users will attend the events that are associated with times within a time interval prior to a time when the specific location was identified 315 and that are also associated with locations within a threshold distance of the specific location, the online system determines 325 an average number of indications that users will attend the events associated with times within the time interval prior to a time when the specific location was identified 315 and associated with locations within the threshold distance of the specific location. For example, the online system 140 sums received indications that users will attend the events associated with times within the time interval prior to a time when the specific location was identified and associated with locations within the threshold distance of the specific location and divides the sum by the time interval prior to the time when the specific location was identified 315. In some embodiments, the online system 140 identifies events associated with times within the time interval prior to the time when the specific location was identified 315 and associated with locations within the threshold distance of the specific location for which the online system 140 received 310 at least a threshold number of indications that users will attend the events. The online system 140 determines 325 the average number of indications based on the number of received indications that users will attend the identified events; for example, the online system 140 sums received indications that users will attend the identified events and divides the sum by the time interval prior to the time when the specific location was identified 315. In other embodiments, the online system 140 identifies locations within the threshold distance of the specific location that are associated with at least a threshold number of events based on the maintained information identifying events. The online system 140 identifies events associated with identified locations that are also associated with times within the time interval prior to the time when the specific location was identified 315, associated with locations within the threshold distance of the specific location, and for which the online system 140 received at least the threshold number of indications that users will attend the events. The online system 140 determines 325 the average number of indications based on the number of received indications that users will attend the identified events; for example, the online system 140 sums received indications that users will attend the identified events and divides the sum by the time interval prior to the time when the specific location was identified 315.

If the online system 140 received geographic locations and times from client devices 110 and maintained the geographic locations and times in association with users associated with the client devices 110, the online system 140 determines 325 an average number of users within the time interval prior to the time when the specific location was identified 315 and associated with locations within the threshold distance of the specific location. For example, the online system 140 determines an average number of users for whom the online system 140 maintained geographic locations within the threshold distance of the specific location based on geographic locations and times received from client devices 110 and associated with users. In some embodiments, the online system 140 maintains information identifying a number of users who are in different geographic locations at different times (e.g., different days of the week, different days of a year) based on geographic locations and times received from various client devices 110. For example, the online system 140 maintains information for various locations identifying a number of users associated with client devices 110 from which the online system 140 received geographic location. As another example, the online system 140 applies a trained model to a total number of indications that users will attend events associated with times within the time interval after the time when the specific location was identified 315 and associated with locations within the threshold distance of the specific location and to geographic locations and times received form client devices 110 associated with users. Application of the trained model in the preceding example allows the online system 140 to account for received indications that users will attend events as well as geographic information received from client devices 110 when determining an average number of users within a threshold distance of the specific location.

Additionally, the online system 140 determines 330 a total number of indications that users will attend events associated with times within a time interval after the time when the specific location was identified 315 and associated with locations within the threshold distance of the specific location based on the received indications. In various embodiments, the online system 140 receives the time interval after the time when the specific location was identified 315 from the publishing user. Alternatively, the online system 140 determines the time interval after the time when the specific location was identified 315 based on any suitable criteria.

The online system 140 determines 335 a ratio of the total number of indications that users will attend events associated with times within the time interval after the time when the specific location was identified 315 and associated with locations within the threshold distance of the specific location based on the received indications to the average number of indications that users will attend the events associated with times within the time interval prior to the time when the specific location was identified 315 and associated with locations within a threshold distance of the specific location based on the received indications. In response to the ratio equaling or exceeding a threshold, the online system 140 transmits 340 a notification identifying the specific location and the time interval after the time when the specific location was identified 315 to a client device 110 of a publishing user associated with the specific location. For example, the online system 140 transmits 340 a notification identifying the specific location and the time interval after the time when the specific location was identified 315 for which the online system determined the ratio equaled or exceeded the threshold to the publishing user who identified the specific location to the online system 140.

In some embodiments, the online system 140 determines a percentage increase of the total number of indications that users will attend events associated with times within the time interval after the time when the specific location was identified 315 and associated with locations within the threshold distance of the specific location based on the received over the average number of indications that users will attend the events associated with times within the time interval prior to the time when the specific location was identified 315 and associated with locations within a threshold distance of the specific location and identifies the percentage increase in the notification. The notification may include a recommendation to the publishing user to provide a content item associated with the specific location to the online system 140 for presentation to users; in some embodiments, the online system 140 retrieves characteristics of users from whom indications the users will attend one or more events associated with times within the time interval after the time when the specific location was identified 315 and associated with locations within the threshold distance of the specific location, generates targeting criteria for the content item from the retrieved characteristics, and includes the generated targeting criteria in the notification. This allows the publishing user to leverage characteristics of users who have indicated to the online system 140 that they will be within the threshold distance of the specific location during the time interval to increase likelihoods of the content item being presented to the users who have indicated to the online system 140 that they will be within the threshold distance of the specific location during the time interval to increase likelihoods of the content item. Alternatively or additionally, the online system 140 identifies one or more of the events associated with times within the time interval after the time when the specific location was identified 315 in the notification. For example, the online system 140 includes a name and a location of one or more of the events associated with times within the time interval after the time when the specific location was identified 315 in the notification.

Hence, the online system 140 identifies a specific location based on a deviation of the number of users likely to be within the threshold distance of the specific location during a time interval relative to a historical average number of users within the threshold distance of the specific location. As the online system 140 receives information from users indicating that users plan to attend events at various locations, the online system 140 leverages this information about likely future locations of users along with information identifying locations of users to indicate locations or times when a number of users within the threshold distance of the specific location are likely to increase relative to historical numbers of users within the threshold distance of the specific location. Identifying such a deviation in the number of users within the specific location allows a publishing user to potentially increase a number of users to whom content is presented via the online system 140, which may also increase an amount of revenue the online system 140 receives from the publishing user for presenting content to users.

The online system 140 may also account for information received from one or more third party systems 130 and maintained information identifying a number of users who are in different geographic locations at different times (e.g., different days of the week, different days of a year) based on geographic locations and times received from various client devices 110 to identify a deviation in a number of users within the specific location. For example, the online system 140 receives information identifying events occurring within the threshold distance of the specific location and occurring within the time interval after the time when the specific location was identified 315 from a third party system 130. Information identifying an event occurring within the threshold distance of the specific location received from the third party system 130 may identify a number of users who have indicated they will attend the event or may identify a historical number of users who previously attended the event (e.g., a number of users who attended the event when it previously occurred). The online system may determine 335 a ratio of the total number users who previously attended the event within the threshold distance of the specific location and occurring within the time interval after the time when the specific location was identified 315 or who have indicated they will attend the event within the threshold distance of the specific location and occurring within the time interval after the time when the specific location was identified 315 received from the third party system 130 to the average number of users within the threshold distance of the specific location from the maintained information. In response to the ratio equaling or exceeding a threshold, the online system 140 transmits 340 a notification identifying the specific location and the time interval after the time when the specific location was identified 315 to a client device 110 of a publishing user associated with the specific location, as further described above. Hence, the online system 140 may account for information received from one or more third party systems 130 identifying events occurring within the threshold distance of the specific location and previously received geographic locations and corresponding times received from various client devices 110 when determining whether to transmit 340 the notification to the publishing user.

Figure 4:
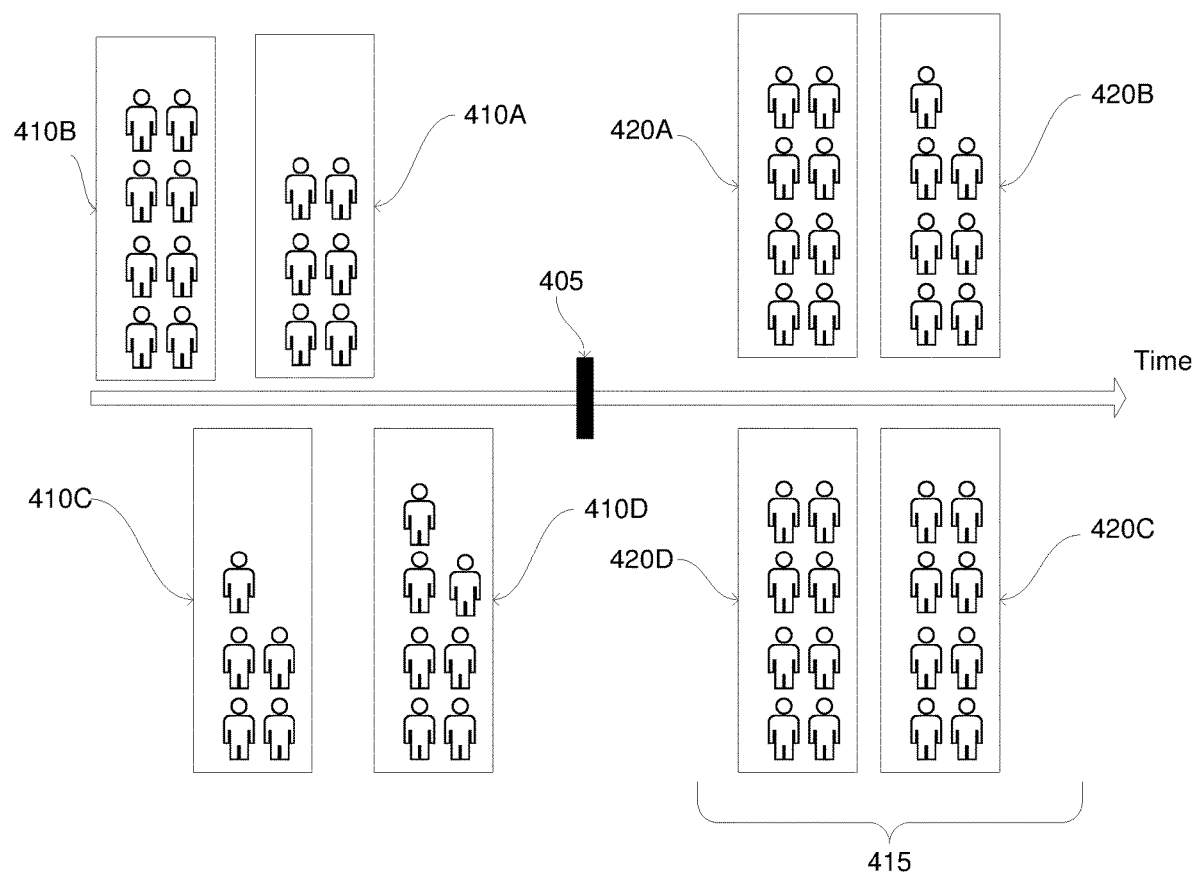
FIG. 4 is a process flow diagram of an online system predicting changes to a number of users within a threshold distance of a location, in accordance with an embodiment.

FIG. 4 is a process flow diagram of online system 140 predicting changes to a number of users within a threshold distance of a location. In the example of FIG. 4, a specific location is identified at a time 405. For example, the online system 140 receives a request identifying the specific location from a publishing user associated with the specific location at the time 405. Receiving the request causes the online system 140 to retrieve information identifying events 410A, 410B, 410C, 410D (also referred to individually and collectively using reference number 410) associated with locations within a threshold distance of the specific location and associated with times prior to the time 405 when the specific location was identified. Hence, the events 410 occurred prior to identification of the specific location. From information associated with the events 410, the online system 140 identifies users who indicated they would attend the events 410 and determines an average number of users within the threshold distance of the specific location based on the users who indicated they would attend the events 410, as further described above in conjunction with FIG. 3.

The online system 140 also retrieves information identifying additional events 420A, 420B, 420C, 420D (also referred to individually and collectively using reference number 420) associated with locations within the threshold distance of the specific location and associated with times after the time 405 when the specific location was identified. Hence, the additional events 420 have not occurred when the specific location is identified. In various embodiments, the additional events 420 are each associated with a time within a time interval 415, which may be specified when the specific location is identified. From the information identifying the additional events 420, the online system 140 determines a total number of users who have indicated they will attend one or more of the additional events 420, as further described above in conjunction with FIG. 3. In various embodiments, the online system 140 determines a ratio of the total number of users to the average number of users within the threshold distance of the specific location. If the ratio equals or exceeds a threshold, the online system 140 transmits a notification to the publishing user indicating that a number of users within the threshold distance of the specific location during the time interval 415 will exceed the average number of users within the threshold distance of the specific location. However, in other embodiments, the online system 140 may generate any suitable metric (e.g., a percent increase) based on a comparison of the total number of users to the average number of users within the threshold distance of the specific location and transmit the notification to the publishing user if the metric indicates the total number of users exceeds the average number of users within the threshold distance of the specific location by at least a threshold amount. As further described above in conjunction with FIG. 3, any suitable information may be included in the notification to increase a likelihood of the publishing user providing content to the online system 140 for presentation to users within the threshold distance of the specific location during the time interval 415.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining, at an online system, information identifying events that are each associated with a location and identifying users who have indicated they will attend one or more of the events;
   receiving, at the online system, location information identifying geographic locations and times associated with the geographic locations from client devices associated with users of the online system;
   storing location information in association with the users of the online system associated with the client devices with which the location information was received;
   receiving, at the online system, a request from a client device of a publishing user associated with a business to evaluate an average number of users within a threshold distance of a geographical location of the business during a first time interval, the request including the geographic location of the business and the first time interval that is prior to a time of the request;
   responsive to receiving the request, determining, by the online system, the average number of users within the threshold distance of the geographic location of the business during the first time interval that is prior to the time of the request based on the stored location information, the average number of users within the threshold distance of the geographic location of the business based on geographic locations received from client devices that are associated with times within the first time interval included in the request;
   determining a total number of indications that users will attend events associated with times within a second time interval that is after the time of the request, the events associated with locations that are different from the geographic location of the business but within the threshold distance of the geographic location of the business based on the maintained information identifying the events;
   applying a trained model to the total number of indications that users will attend events that are associated with the times within the second time interval after the time of the request and that are associated with locations within the threshold distance of the geographic location of the business and to the stored location information to determine an estimated number of users who will be within the threshold distance of the geographic location of the business during the second time interval due to the events;
   determining a ratio of the estimated number of users who will be within the threshold distance of the geographic location of the business during the second time interval to the average number of users within the threshold distance of the geographic location of the business during the first time interval that is prior to the second time interval;
   transmitting a notification identifying the geographic location of the business and the second time interval after the time of the request to the client device of the publishing user in response to the ratio equaling or exceeding a threshold, the notification including a recommendation to the publishing user to provide a content item associated with the geographic location of the business to the online system for presentation to users during the second time interval;
   receiving, by the online system, one or more content items associated with the geographic location of the business from the client device of the publishing user responsive to the notification; and
   providing, by the online system, the one or more content items to client devices of one or more users while the one or more users attend the events that are associated with the locations within the threshold distance of the geographic location of the business during the second time interval.

2. The method of claim 1, wherein the notification includes targeting criteria for the content item determined by the online system from characteristics of users from whom the online system received indications that the users will attend one or more events associated with the times within the second time interval that is after the time of the request and associated with locations within the threshold distance of the geographic location of the business.

3. The method of claim 1, wherein determining the average number of users within the threshold distance of the geographic location of the business based on the stored location information comprises:
identifying locations within the threshold distance of the geographic location of the business associated with at least a threshold number of events;
identifying events associated with an identified location, associated with times within the first time interval prior to the time of the request, and associated with locations within the threshold distance of the geographic location of the business for which the online system received at least a threshold number of indications that users will attend the events; and
determining the average number of users within the threshold distance of the geographic location of the business based on the stored location information identifying users within the threshold distance of the geographic location of the business during the first time interval prior to the time of the request.

4. The method of claim 1, wherein the first time interval that is prior to the time of the request is also prior to occurrence of the events.

5. A computer program product comprising a non-transitory computer readable storage medium having instructions encoded thereon that, when executed by a processor, cause the processor to:
maintain, at an online system, information identifying events that are each associated with a location and identifying users who have indicated they will attend one or more of the events;
receive, at the online system, location information identifying geographic locations and times associated with the geographic locations from client devices associated with users of the online system;
store location information in association with the users of the online system associated with the client devices with which the location information was received;
receive, at the online system, a request from a client device of a publishing user associated with a business to evaluate an average number of users within a threshold distance of a geographical location of the business during a first time interval, the request including the geographic location of the business and the first time interval that is prior to a time of the request;
responsive to receiving the request, determine, by the online system, the average number of users within the threshold distance of the geographic location of the business during the first time interval that is prior to the time of the request based on the stored location information, the average number of users within the threshold distance of the geographic location of the business based on geographic locations received from client devices that are associated with times within the first time interval included in the request;
determine a total number of indications that users will attend events associated with times within a second time interval that is after the time of the request, the events associated with locations that are different from the geographic location of the business but within the threshold distance of the geographic location of the business based on the maintained information identifying events;
apply a trained model to the total number of indications that users will attend events that are associated with the times within the second time interval after the time of the request and that are associated with locations within the threshold distance of the geographic location of the business and to the stored location information to determine an estimated number of users who will be within the threshold distance of the geographic location of the business during the second time interval;
determine a ratio of the estimated number of users who will be within the threshold distance of the geographic location of the business during the second time interval to the average number of users within the threshold distance of the geographic location of the business during the first time interval that is prior to the second time interval;
transmit a notification identifying the geographic location of the business and the second time interval after the time of the request to the client device of the publishing user in response to the ratio equaling or exceeding a threshold, the notification including a recommendation to the publishing user to provide a content item associated with the geographic location of the business to the online system for presentation to users during the second time interval;
receive, by the online system, one or more content items associated with the geographic location of the business from the client device of the publishing user responsive to the notification; and
provide, by the online system, the one or more content items to client devices of one or more users while the one or more users attend the events that are associated with the locations within the threshold distance of the geographic location of the business during the second time interval.

6. The computer program product of claim 5, wherein the notification includes targeting criteria for the content item determined by the online system from characteristics of users from whom the online system received indications that the users will attend one or more events associated with the times within the second time interval that is after the time of the request and associated with locations within the threshold distance of the geographic location of the business.

7. The computer program product of claim 5, wherein determine the average number of users within the threshold distance of the geographic location of the business based on the stored location information comprises:
identify locations within the threshold distance of the geographic location of the business associated with at least a threshold number of events;
identify events associated with an identified location, associated with times within the first time interval prior to the time of the request, and associated with locations within the threshold distance of the geographic location of the business for which the online system received at least a threshold number of indications that users will attend the events;
and determine the average number of users within the threshold distance of the geographic location of the business based on the stored location information identifying users within the threshold distance of the geographic location of the business during the first time interval prior to the time of the request.

* * * * *